United States Patent [19]

Reginato et al.

[11] Patent Number: 5,152,961
[45] Date of Patent: Oct. 6, 1992

[54] METHOD OF STORING PERBORATE MONOHYDRATE

[75] Inventors: Luigi Reginato; Alessandra Pastacaldi, both of Rosignano-Solvay, Italy

[73] Assignee: Interox Chimica, S.p.A., Rosignano Solvay, Italy

[21] Appl. No.: 517,312

[22] Filed: May 1, 1990

[30] Foreign Application Priority Data

May 3, 1989 [IT] Italy ................................. 20361A

[51] Int. Cl.⁵ ............................................. F26B 3/00
[52] U.S. Cl. ........................................ 422/40; 422/1; 34/32; 34/22
[58] Field of Search ............ 422/40, 1; 34/15, 22, 34/57 R, 218, 227, 233, 235, 32 X; 220/601, 661, 4.12, 562; 423/281

[56] References Cited

U.S. PATENT DOCUMENTS

| | | | |
|---|---|---|---|
| 2,828,183 | 3/1958 | Altimier et al. | 423/281 |
| 2,947,602 | 8/1960 | Youngman et al. | 423/281 |
| 3,375,198 | 3/1968 | Rosenfelder | 423/281 |
| 3,934,355 | 1/1976 | Weibull | 34/225 |
| 4,025,296 | 5/1977 | Buchner | 34/57 R |
| 4,053,991 | 10/1977 | Steffen | 34/233 |
| 4,134,216 | 1/1979 | Stevens | 34/27 |
| 4,200,657 | 4/1980 | Cook | 422/40 |
| 4,256,029 | 3/1981 | Steffen et al. | 34/233 |
| 4,530,167 | 7/1985 | Hotovy | 34/233 |
| 4,800,653 | 1/1989 | Steffen | 34/233 |
| 4,870,760 | 10/1989 | Gräff | 34/32 |

OTHER PUBLICATIONS

Interox, "Sodium Perborate Monohydrate Bulk Storage-Technical Data Sheet", Oct. 1987.
Windholz et al., *The Merck Index*, 1983, p. 8501, #8492.
Ullmans Encyklopädie technischen Chemie, Verlag Chemie, Weinheim, 1979, 4th edition, vol. 17, pp. 718-719, p. 719, section 5.1.1.5., 3rd paragraph and section 5.1.1.6., 1st paragraph.

*Primary Examiner*—Robert J. Warden
*Assistant Examiner*—T. A. Trembley
*Attorney, Agent, or Firm*—Willian Brinks Olds Hofer Gilson & Lione

[57] ABSTRACT

Method of storing sodium perborate monohydrate granules at elevated surrounding temperature of between 10° and 65° C., according to which the granules are stored in bulk in a closed enclosure proofed against the surrounding atmosphere, into which is introduced a slow flow of dry air which is forced to pass through the mass of the granules, the air flow escaping to the atmosphere through a small opening made in the part of the enclosure away from that where the said flow is introduced.

The process applies to the transport of sodium perborate monohydrate in a tank truck.

15 Claims, No Drawings

METHOD OF STORING PERBORATE MONOHYDRATE

The present invention relates to the field of methods of storage of perborate monohydrate.

It has long been known that sodium perborate monohydrate, in contrast to sodium perborate tetrahydrate, is a hygroscopic product which must be stored protected against the moisture present in atmospheric air. It is also recommended to store sodium perborate monohydrate in a cool place (Ullmans Encyklopädie der technischen Chemie, Verlag Chemie, Weinheim, 1979, 4th edition, volume 17, pages 718 to 719, * page 719 section 5.1.1.5., 3rd paragraph and section 5.1.1.6., 1st paragraph *).

Whilst it is relatively easy to satisfy the first condition, for example by performing the storage of perborate in closed silos or in moistureproof bags, this is not the case insofar as the second condition is concerned. In fact, it is generally difficult and not very practical to design storage silos for perborate monohydrate which are equipped with cooling devices, just as it is generally not possible to store leakproof bags containing perborate monohydrate in air-conditioned chambers specially constructed for this purpose.

As a result, perborate monohydrate is in most cases stored in storage facilities which are in thermal equilibrium with the surrounding atmosphere. Now, in the cases where the surrounding temperature is relatively high, as is frequently usual in summer or in countries which have the benefit of a warm climate, it is not infrequent for the stability of stocks of perborate monohydrate to be compromised. Product decomposition phenomena which then occur give rise to various disadvantages such as: decrease, or even in certain cases disappearance, of the active oxygen content of the product, caking of the granules, release of water, partial dissolution of the perborate. When they are produced at elevated surrounding temperature, generally above 35° C., these phenomena can even lead to the self-heating of the mass of granules and can induce a series of rapid decomposition reactions of the whole mass of perborate.

The invention is intended to overcome these disadvantages by providing a method of storing granules of sodium perborate monohydrate which permits the product to be stored at relatively elevated temperatures without inducing decomposition of the mass of granules.

To this end, the invention relates to a method of storing sodium perborate monohydrate granules at elevated surrounding temperature of between 10° and 65° C., according to which the granules are stored in bulk in a closed enclosure proofed against the surrounding atmosphere, a slow flow of dry air is introduced into the closed enclosure, this flow of air is forced to pass through the mass of the granules and a small opening is made in the part of the enclosure away from that where the flow of air is introduced, so as to allow the air to escape into the atmosphere.

Sodium perborate monohydrate is a well-known product which corresponds to the theoretical empirical formula $NaBO_2.H_2O_2$ and whose active oxygen content is between 150 and 160 g/kg. This product is in the form of solid granules whose mean diameter lies between 0.10 mm and 0.90 mm and, preferably, between 0.15 and 0.60 mm.

The closed enclosure in which the sodium perborate monohydrate is stored in bulk refers to any kind of closed capacity which is gasproof and, in particular, proofed against the surrounding atmosphere. Enclosures of various forms and capacities may be suitable and are chosen according to the conditions of use of the perborate monohydrate. It is thus possible to find cylindrical silos arranged so that the axis of the cylinder is vertical or cylindrical silos whose axis is horizontal.

In most cases it is preferable that silos of cylindrical shape be arranged vertically, for obvious reasons of minimum congestion, and also to ensure an easier discharge of the stored material.

The horizontal silos may also constitute the vessel of a tank truck or wagon intended for conveying sodium perborate monohydrate granules.

The closed enclosure may also constitute a silo of parallelepipedal or prismatic shape. In the former case, the parallelepiped may rest on one of the faces opposite its longest ridges or, on the contrary, may rest on a face containing its longest ridge, the difference being of no importance.

The capacity of the enclosure may vary greatly as a function of the type of use of the perborate. It is generally between 1 m$^3$ and 800 m$^3$.

According to the invention, a slow flow of dry air is introduced into the closed enclosure. The introduction of dry air is easily implemented by making a small opening, permitting a pipe delivering the dry air to be attached, in a wall of the enclosure on which the perborate granules are resting.

Dry air is intended to mean air whose dew point is below $-20°$ C., preferably below $-30°$ C.

According to a nonessential alternative form of the invention, the dry air may be distributed in the enclosure by a device which produces its dispersion throughout the cross-section of the enclosure as, for example, a manifold carrying jets ensuring the air distribution or dispersion heads made of porous material.

A small opening is made in the part of the enclosure away from that for the introduction of air, its diameter being similar to that of the air entry pipe, the aim being to allow the air introduced to leave.

The dry air is forced through the granules in the enclosure by being taken to a slight overpressure relative to atmospheric pressure. The air pressure must be chosen for each individual enclosure so as to overcome the pressure drops in the mass of the granules and to produce a purging rate of between 1 and 8 l/h kg of perborate and, preferably, a flow rate of 2 to 5 l/h kg of perborate.

The examples which follow are intended to illustrate the invention without limiting its scope.

EXAMPLE 1

1 g of perborate monohydrate was placed in a microcalorimeter LKB (Trade mark) type No.2277 equipped with a perfusion cell No. 2277-402. After the whole mass consisting of the perborate and the measurement cell was made to reach a thermal equilibrium at 40° C., a heat release was detected on the calorimeter recorder, which becomes steady at a value close to 2μ W/g after more than 20 h of operation.

EXAMPLE 2

1 g of perborate monohydrate was placed in the same cell as that described in Example 1 and the cell was purged with a stream of dry air at a flow rate of 5 cm$^3$/h.

The perfusion cell No. 2277-402 which was employed was designed to bring the air into equilibrium at 40° C. before its contact with the perborate monohydrate contained in the cell.

The heat effect measured by the calorimeter became rapidly steady, after a few minutes, at a lower endothermic value of approximately $-24\mu$ W/g.

The determination of the quantity of water emitted at 40° C. by the perborate sample into the purging air revealed the loss of approximately $81 \times 10^{-6}$ moles of $H_2O$/mole of perborate monohydrate.

EXAMPLE 3

1 g of perborate monohydrate was again placed in the same cell as that described in Examples 1 and 2 and the cell was purged with a stream of water-saturated air at 40° C. at a flow rate of 5 cm$^3$/h. Under these conditions a very unstable exothermic behaviour of the sodium perborate monohydrate was measured in the calorimeter, with exothermic oscillations whose amplitude reached $30\mu$ W/g.

EXAMPLE 4

Two glass cylinders, 7.5 cm in diameter and 45 cm in height, resting on their closed base and both equipped with a jacket permitting thermostating by circulating water at a constant temperature were each filled with 400 g of perborate monohydrate and were closed in their upper part by a transparent polyethylene film. A tube was immersed as far as the base into one of the two cylinders, allowing air to be injected, and the polyethylene film closing the top of the cylinder was pierced by a hollow hypodermic needle to allow the purging air to escape.

After both the cylinders and the contents had been brought to a temperature of 80° C., one of the two cylinders was purged by means of dry air preheated to 80° C. at a flow rate of 3.0 l/h.

The storage of the two cylinders at 80° C. and the purging of one of the two cylinders were continued for 16 hours. It was noted that the perborate in the cylinder which was not subjected to purging caked and increased considerably in volume, to the point of lifting the polyethylene film closing the top of the cylinder and coming out of the latter.

Analysis of the products after the test period showed that the perborate which had not been subjected to purging with dry air was completely decomposed and no longer contained any active oxygen detectable by permanganate determination, whereas the perborate which had the benefit of purging with the stream of dry air at 80° C. had two appearances, that is to say caked in the upper half of the cylinder and a free-flowing powder in the lower half. The active oxygen contents, measured by permanganate determination, were 133.9 g of oxygen/kg of perborate in the case of the free-flowing powder part and 96.9 g/kg in the case of the caked part. The active oxygen content of the starting perborate was 156.7 g/kg.

EXAMPLE 5

Example 4 was repeated on another perborate monohydrate under the same operating conditions, except for the flow rate of purging dry air which was reduced to 1.5 l/h and the length of the est which was extended to 48 h.

At the end of the test the perborate monohydrate in the cylinder which had been subjected to the purging with dry air kept the appearance of a free-flowing powder throughout the cylinder. The perborate in the cylinder which had not had the benefit of purging with dry air was completely caked and had come out of the cylinder. The free-flowing powder still titrated at 120 g of active oxygen/kg at the end of the test, whereas the caked perborate now contained only 50.4 g of active oxygen/kg at the top of the cylinder and only 11.9 g/kg at the bottom of the cylinder. The starting perborate contained 156.0 g of active oxygen/kg.

We claim:

1. A method of storing sodium perborate monohydrate granules in bulk, comprising storing sodium perborate monohydrate granules in a closed enclosure proofed against surrounding atmosphere, introducing into the closed enclosure a flow of dry air at an elevated surrounding temperature of 10°–65° C., forcing said flow of dry air to pass through the mass of the sodium perborate monohydrate granules and releasing said flow of dry air to the atmosphere through an opening made in a part of the closed enclosure, said opening positioned away from that where the flow of dry air is introduced, thereby allowing the flow of dry air to escape via a passage through the mass of the sodium perborate monohydrate granules into the atmosphere.

2. The method according to claim 1, wherein the flow of dry air is between 1 and 8 l/h kg of perborate.

3. The method according to claim 1, wherein the dew point of the flow of dry air is below $-20°$ C.

4. The method according to claim 1, wherein said closed enclosure comprises a plurality of faces, the flow of dry air being introduced through an orifice made in one of the faces of smallest surface area.

5. The method according to claim 1, wherein the closed enclosure is a silo of cylindrical shape with a vertical axis.

6. The method according to claim 1, wherein the closed enclosure is a silo of parallelepipedal shape resting on one of the faces opposite its longest ridges.

7. The method according to claim 1, wherein the closed enclosure is a silo of cylindrical shape with a horizontal axis.

8. The method according to claim 7, wherein the silo constitutes the vessel of a tank wagon or truck intended for conveying granular solid materials.

9. The method according to claim 1, wherein the closed enclosure is a silo of parallelepipedal shape resting on a face containing its longest ridge.

10. The method according to claim 1, wherein the closed enclosure is a silo of prismatic shape.

11. The method according to claim 1, wherein said flow of dry air is between 2 and 5 l/h kg of perborate.

12. The method according to claim 1, wherein the dewpoint of the flow of dry air is below $-30°$ C.

13. The method according to claim 1, wherein the mean diameter of said sodium perborate monohydrate granules is between 0.10 and 0.90 mm.

14. The method according to claim 1, wherein the mean diameter of said sodium perborate monohydrate granules is between 0.15 and 0.60 mm.

15. The method according to claim 1, wherein said closed enclosure has a capacity between 1 m$^3$ and 800 m$^3$.

* * * * *